Dec. 11, 1945. R. R. CARLSON 2,390,640
METER TESTING INSTRUMENT SUPPORT
Filed Aug. 21, 1942 2 Sheets-Sheet 1
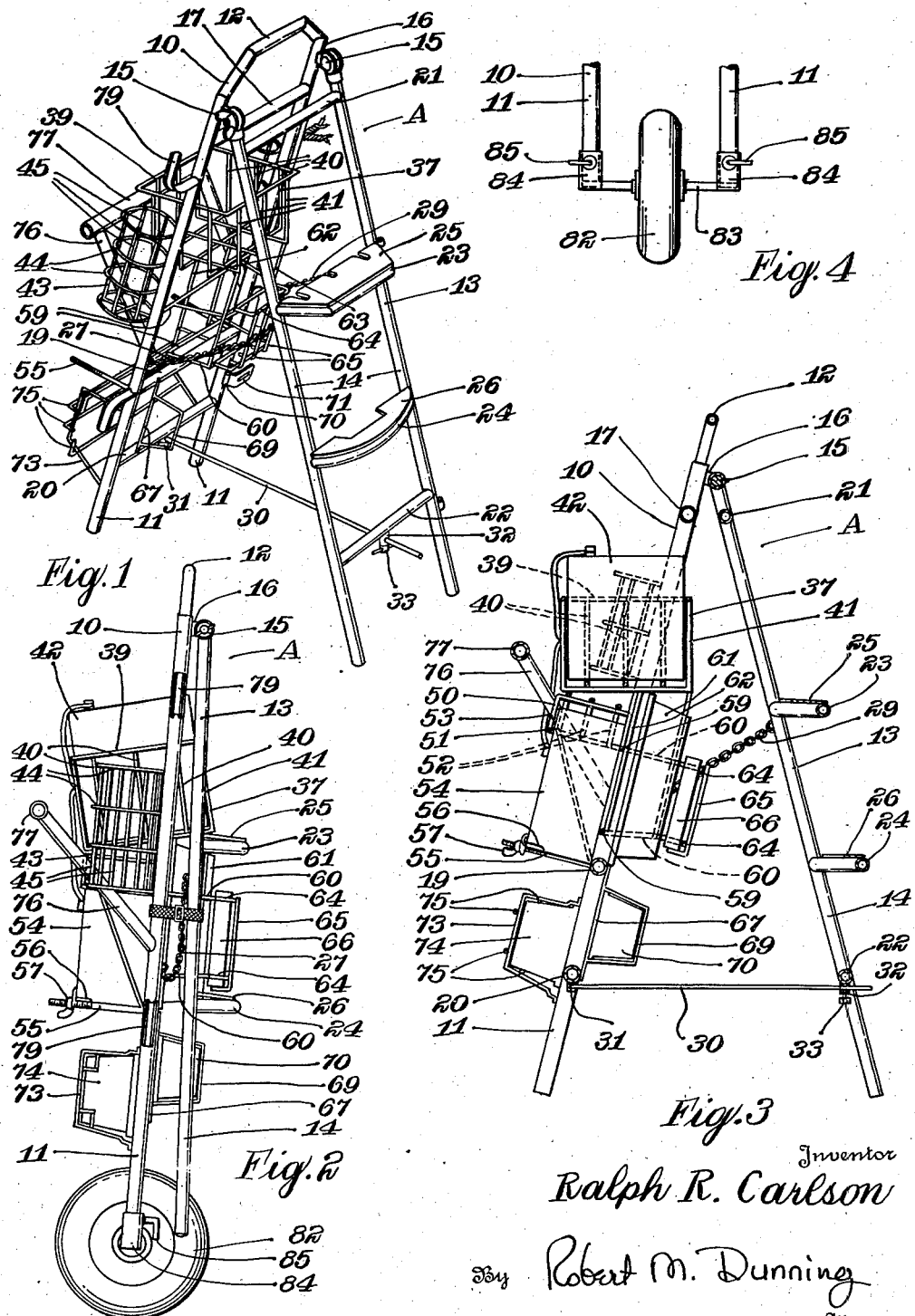
Inventor
Ralph R. Carlson
By Robert M. Dunning
Attorney Dec. 11, 1945.    R. R. CARLSON    2,390,640
METER TESTING INSTRUMENT SUPPORT
Filed Aug. 21, 1942    2 Sheets-Sheet 2

Inventor
Ralph R. Carlson
By Robert M. Dunning
Attorney

Patented Dec. 11, 1945

2,390,640

UNITED STATES PATENT OFFICE 2,390,640

METER TESTING INSTRUMENT SUPPORT

Ralph R. Carlson, St. Paul, Minn.

Application August 21, 1942, Serial No. 455,667

3 Claims. (Cl. 211—71)

My invention relates to an improvement in meter testing instrument support, wherein it is desired to provide a novel means of supporting equipment such as is used for testing meters and the like.

Meters used for measuring electrical current must be tested for accuracy from time to time in the operation thereof. In testing the meters, they are either removed and replaced and taken to a repair laboratory, or else portable equipment is taken to the mounted meter for testing the same while in place. While the former method is often more convenient, it has been found that the meters are sometimes injured during transportation or replacement. Accordingly, the testing of the meters while they are actually installed is often considered the safest method.

It is the usual practice to carry the necessary instruments, tools, connection wires and extension cords necessary for checking the meter to the meter location in a suitable set of carrying cases. It is then necessary to remove these instruments from their cases, connect them up, and make the necessary tests. As the meters are often mounted high on a wall, or over a stairway, it is then usually necessary either to borrow a ladder or chair to stand on, or to so construct the carrying case that it will hold the weight of the man making the test.

It is the object of the present invention to construct a support for instruments necessary for making the tests which will simplify the testing operation and permit completion of the tests in an extremely short period of time. This support will provide a space for all instruments, tools, connecting wires and the like, and will permit the testing of the meter without removing all of the instruments from their support. Certain of the wiring is incorporated in the support by means of which the testing operation is simplified. As a result, it is only necessary to connect predetermined wires to the meter and to make the test. Repair parts and the necessary repair tools are also supported.

An object of the present invention lies in the formation of an instrument support having a front instrument supporting frame and a rear leg frame pivotally secured to the front frame near the upper end thereof. The rear leg frame includes a series of spaced steps arranged to form a narrow step ladder. Accordingly, the instrument support may be used as a step ladder to permit the person making the test to reach meters mounted high upon a wall without the use of extra equipment.

A feature of the present construction lies in the fact that the frame is relatively narrow, making it possible to erect the frame on steps of a stairway. This feature is of importance, due to the common practice of mounting meters above stairways.

A further feature of the present invention lies in the provision of a means of limiting the pivotal movement of the leg frame with respect to the front instrument supporting frame. As a result, the support may be used as a step ladder without danger of the two frames spreading apart and collapsing. In addition, I provide a means for securing the two frames in properly spaced relation when erected, to prevent the two frames from pivoting together to collapse the support.

It is an object of the present invention to provide a support for meter testing instruments equipped with a detachable wheel so arranged that the support may be rolled along the surface of the ground. The testing instruments and necessary tools are heavy to carry from one location to another. As the testing equipment must usually be moved to several different locations in a day, the weight of the instruments would become burdensome to carry. By adding the wheel to the lower end of the support, however, the equipment may be moved about with little difficulty, as most of the weight of the equipment is carried by the supporting wheel. The wheel axle is provided with spaced sockets into which the lower end of one of the frame members may detachably engage.

A further feature of the present invention lies in the provision of a reversing switch mounted on the support in such a manner that the wires connecting the meter to the testing equipment may be reversed. This obviates the necessity of removing the test wires from the meter to reverse the same, decreasing the work and time necessary in making the test, and lessening the chance of short circuiting the wiring.

A further feature of the present invention lies in the provision of a series of removable supports for containing tools, spare repair parts, a flashlight, and the like. Provisions are also made for supporting connection wires and an extension cord often used in making the tests. Thus a compact support is provided which may be readily moved about, and which supports all of the instruments, tools, and equipment necessary for the testing and repairing job.

These and other objects and novel features of my invention will be more clearly and fully set forth in the following specification and claims.

In the drawings forming a part of my specification:

Figure 1 is a perspective view of the meter testing instrument support erected, with the instruments removed therefrom.

Figure 2 is a side elevational view of the support in its collapsed position, in readiness to be moved.

Figure 3 is a side elevational sectional view vertically through the support in erected position.

Figure 4 is a detail view of the supporting wheel construction.

Figures 5, 6:
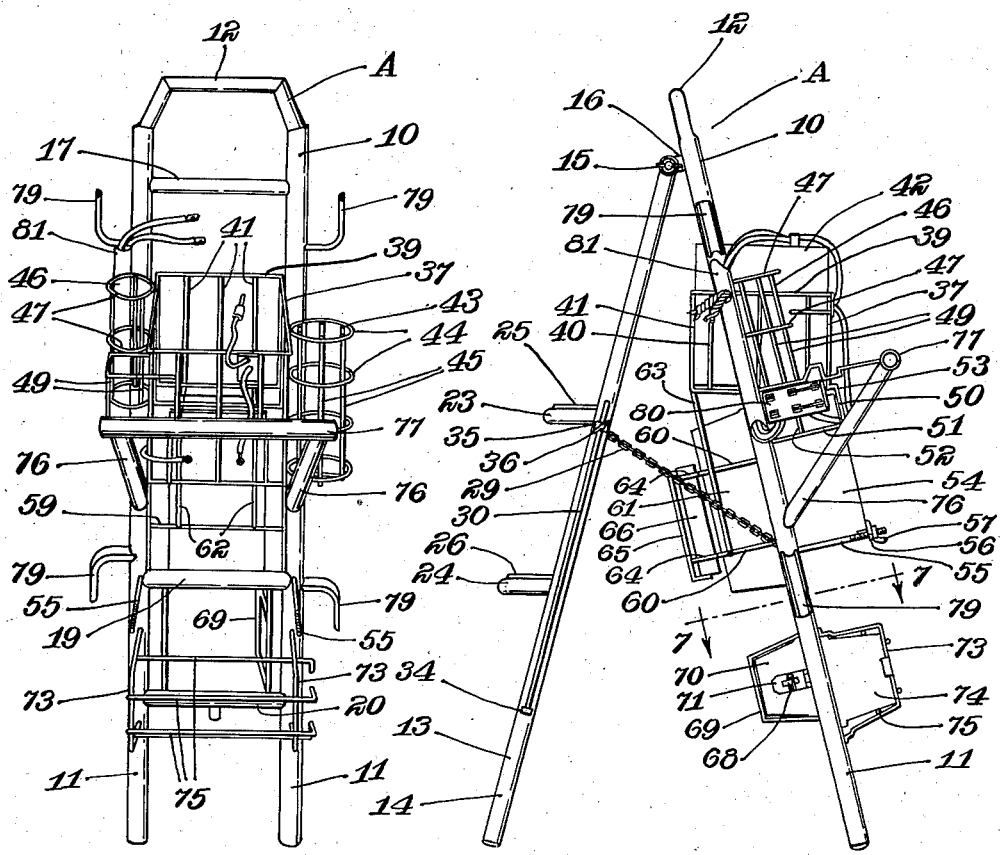
Figure 5 is a front perspective view of the support with the instruments removed therefrom.
Figure 6 is an elevational view of the side of the support opposite to that best shown in Figure 1 of the drawings.

The meter testing instrument support A comprises a substantially U-shaped front frame member 10 including a pair of parallel legs 11 and a top handle element 12 connecting the legs 11. A rear leg frame 13 includes a pair of parallel legs 14 each pivotally connected by a detachable pivot bolt 15 to a rearwardly extending ear 16 on the front frame member 10. The legs 11 and 14 are preferably tubular to provide the necessary strength without sacrificing weight.

Tubular transverse connecting members 17, 19 and 20 connect the parallel legs 11 at intervals throughout their length. Similar tubular transverse connecting members 22 and 21 connect the parallel legs 14 of the rear frame. Outwardly bowed tubular connecting members 23 and 24, at spaced intervals from the connecting members 21 and 22, also connect the two parallel legs 14. Plates 25 and 26 are welded or otherwise secured to the connecting members 23 and 24 to form flat steps.

Flexible connecting chains 27 and 29 connect the frame members 10 and 13 to limit the spread of these members apart. A rod 30 may be used to hold the erected frame members 10 and 13 in spread formation. A socket 31 depending from the cross connecting member 20 is designed to receive one end of the rod 30. The rod 30 is also designed to extend through an aperture in a depending lug 32 depending from the transverse connecting member 22. A thumb screw 33 may be tightened against the rod 30 in the lug 32 to hold the rod from longitudinal movement through the aperture in the lug 32.

As best seen in Figure 6 of the drawings, the rod 30 is supported by one of the legs 14 when not in use. A socket 34 is provided to accommodate the lower end of the rod 30 which is also extending through an aperture in a lug 35 on the leg 14. A thumb nut 36 in the lug 35 holds the rod in this supported position.

A basket or pocket 37 is supported between the legs 11 of the front frame member 10. This basket 37 includes a rectangular frame 39 extending around the upper edge thereof, and a series of U-shaped connecting wires extending from one side to the other thereof, designated in the drawings by the number 40. A second series of U-shaped wires 41 connect the front and rear edges of the frame 39, these wires 41 crossing the wires 40 to form the base of the basket. This basket 37 is designed to support an instrument known as a watt hour standard used in the testing of the meters. This instrument is designated by the numeral 42.

On one side of the basket 37, and secured to one of the legs 11 of the frame 10 I provide a hollow cylindrical receptacle 43. This receptacle is preferably formed of a series of superimposed and spaced rings 44 held in proper relation by angularly spaced U-shaped wires 45 which cross at the bottom to form a lower closed end. The receptacle 43 is designed to contain the bulb and bulb socket of an extension cord not shown in the drawings. This receptacle may also support a dusting cloth which may, if desired, be wrapped about the extension cord bulb to cushion the same.

On the side of the frame 10 opposite to that supporting the receptacle 43, I provide a second elongated hollow cylindrical receptacle 46. In the construction shown, this receptacle 46 is also formed of a series of spaced parallel rings 47 connected by side connecting wires 49. This receptacle is used for supporting a flashlight often necessary for use before the extension cord may be connected. This flashlight is not shown in the drawings.

Below the basket 37, and between the legs 11 of the frame 10, I provide an inverted basket 50. This inverted basket is formed by a rectangular wire frame 51, and inverted U-shaped cross wires 52 connecting the opposed sides of the frame 51, and inverted U-shaped cross wires 53 connecting the opposed ends of the frame. These wires 52 and 53 cross to form a top for the basket. This basket 50 forms an enclosure for the upper end of the load box 54 used in testing the meters, and acts to hold this load box in proper position.

In order to secure the load box 54 in place, I provide a pair of studs 55 projecting forwardly from the legs 11 of the frame 10. Clips 56 are slidably mounted on the studs 55 which engage the corners of the load box 54. Thumb nuts 57 on the studs clamp the clips 56 against the outer corners of the box 54, clamping this box against the cross member 19 on the frame 10 as best illustrated in Figure 3 of the drawings.

A pair of connecting wires 59 are secured extending between the legs 11, and a pair of U-shaped loops 60 extend rearwardly from these connecting wires to encircle a tool container 61 to slidably support the same. Bracing wires 62 are secured to the connecting wires 59 and extend upwardly to the bottom of the basket 37. Other bracing wires 63 also extend downwardly from the basket 37 and are connected to the loops 60 to hold the same in properly spaced relation. These bracing wires 62 and 63 extend longitudinally of the tool container 61 which is removable from the bottom of its support. The lower forward edge of the tool container may bear against the cross member 19 as shown in Figure 3 of the drawings, the supporting wires flexing sufficiently to allow the container to be slid downwardly in removing the same, or to be slid upwardly into the position shown in Figure 3.

A pair of U-shaped loops 64 are terminally welded or otherwise secured to the rear of the loops 60 and project rearwardly therefrom. Substantially L-shaped wires 65 connect the loops 64 and extend inwardly at their lower ends to provide a closed lower end for the compartment thus formed. A small spare part container 66 is slidably supported within the loops 64, and may be removed by an upward slidable movement.

Figure 7:
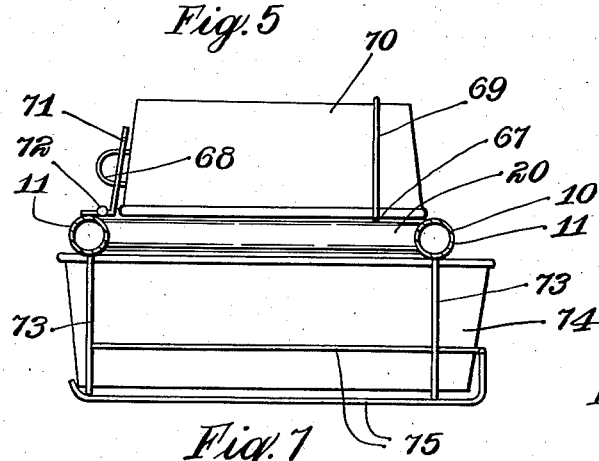
Figure 7 is a transverse sectional view, the position of the section being indicated by the line 7—7 of Figure 6.

A connecting wire 67 parallel to the legs 11 connects the cross members 19 and 20. A wire loop of U-shape is terminally connected to this connecting wire 67. This loop 69 is designed to encircle the body of a container 70 to be used for containing spare parts and the like. An L-shaped hasp 71 is hinged at 72 to a leg 11, as illustrated in Figure 7 of the drawings. This hasp 71 is designed to engage over a staple-shaped strip 68 secured to the end of the container 70. A lock or pin may be inserted in the staple 72 to prevent removal of the container 70 and also the container 61.

A pair of forwardly extending U-shaped loops 73 are terminally connected to the legs 11. These loops 73 are designed to encircle a parts container 74 which is slidably engaged therein. Transversely extending guide wires 75 secured to the loops 73 are turned at right angles at one end thereof to form inwardly projecting portions to limit slidable movement of the container 74 in one direction. The container 74 is slidably removable from the other end of the support thus formed.

A pair of angularly extending tubular members 76 are welded or otherwise connected to the frame member 10; and the outer ends of these members 76 are connected by a cross connecting tubular member 77. These frame elements form a guard for the instruments mounted on the frame, and also provide a handle by means of which the entire support may be lifted and carried.

A pair of substantially L-shaped brackets 79 are secured to each of the legs 11 in opposed relation. The extension cord and various connecting wires may be wound between the opposed brackets of each pair, providing a support for these wires, cords, and cables.

A reversing switch 80 is secured on one side of the frame. Wires from this switch are enclosed in a conduit housing 81 secured to one frame leg 11, and the various wires to the instruments are shown extending from the switch 80 to the instruments. The direction of flow of the current may be regulated by this reversing switch.

In order to portably support the entire unit, I provide a rubber tired wheel 82 rotatably mounted upon an axle 83. This axle 83 supports a pair of spaced sockets 84 designed to receive the lower extremities of the legs 11 of the frame 10. Thumb screws or the like 85 are provided in the sockets 84 to hold the legs within the sockets. When in place, as shown in Figure 2 of the drawings, the entire support A may be supported upon the wheel 82 and rolled along the surface of the ground.

The unit is of such a size that it can be readily rolled or carried from place to place. It may be erected upon a step of a stairway, or on any substantially level surface, holding all of the instruments accessible for testing purposes, and providing a ladder by means of which the tester may reach to relatively high locations. All of the necessary instruments, tools, and spare parts are unitarily supported, greatly simplifying the operation of testing a meter. Straps such as 86 may be bound about the legs 11 and 14 if desired when the support A is collapsed to hold the support in this position.

In accordance with the patent statutes, I have described the construction and operation of my support for meter testing instruments, and while I have endeavored to set forth the best embodiment thereof, I desire to have it understood that obvious changes may be made within the scope of the following claims without departing from the spirit of my invention.

I claim:

1. A meter testing instrument support including a frame comprising two hingedly connected sections, a series of supports for meter testing instruments mounted on one section of said frame, a pair of arms projecting angularly from said one section of said frame on either side of said meter testing instruments, a cross member connecting the outer extremities of said arms, said connecting member providing a guard for said instruments and providing a handle by means of which said frame and said instruments may be carried.

2. A meter testing instrument support comprising a frame including a pair of substantially parallel frame members and connecting members between said parallel frame members, a basket between said frame members for supporting a meter testing instrument, an inverted basket for accommodating the upper extremity of a second meter testing instrument, clamping means connected to said frame for holding the second meter testing instrument in place, guides for slidably supporting containers on said frame, and containers slidably supported in said guides.

3. A meter testing instrument support comprising a frame including a pair of substantially parallel frame members and connecting members therebetween, an inverted basket secured to said frame members adapted to accommodate the upper extremity of a meter testing instrument, a pair of bolts projecting from said frame and spaced apart a distance slightly wider than the meter testing instrument, and means on said bolts adapted to engage with said meter testing instrument when the upper end thereof is engaged in said inverted basket to hold the meter testing instrument in place and to prevent downward movement thereof.

RALPH R. CARLSON.